United States Patent [19]

Kagotani et al.

[11] Patent Number: 5,419,938
[45] Date of Patent: May 30, 1995

[54] MAGNETIC RECORDING MEDIUM COMPRISING TWO MAGNETIC LAYERS OF HEXAGONAL FERRITE MAGNETIC PARTICLES AND BINDER WHEREIN THE EASY AXES OF THE PARTICLE IS SPECIFIED

[75] Inventors: Tsuneo Kagotani; Kenji Yokoyama; Keiji Koga; Yasumichi Tokuoka, all of Nagano, Japan

[73] Assignee: TDK Corporation, Tokyo, Japan

[21] Appl. No.: 83,498

[22] Filed: Jun. 30, 1993

[30] Foreign Application Priority Data

Jul. 3, 1992 [JP] Japan .................................. 4-200662

[51] Int. Cl.$^6$ ............................................. G11B 5/00
[52] U.S. Cl. ..................................... 428/64; 428/212; 428/329; 428/694 BH; 428/694 BM; 428/900; 427/131; 360/135
[58] Field of Search ................. 428/694 BH, 694 BM, 428/329, 212, 64, 900; 427/131; 360/135

[56] References Cited

U.S. PATENT DOCUMENTS

| | | | |
|---|---|---|---|
| 4,414,124 | 11/1983 | Endo et al. ......................... | 252/62.63 |
| 4,442,159 | 4/1984 | DeZawa et al. ..................... | 428/212 |
| 4,629,653 | 12/1986 | Asai et al. ............................ | 428/328 |
| 4,822,634 | 4/1989 | Takahashi et al. ................... | 427/48 |
| 5,104,750 | 4/1992 | Kubo et al. .......................... | 428/694 |
| 5,114,801 | 5/1992 | Aoki et al. ........................... | 428/694 |

FOREIGN PATENT DOCUMENTS

| | | |
|---|---|---|
| 59-129935 | 7/1984 | Japan . |
| 61-184725 | 8/1986 | Japan . |
| 63-71924 | 4/1988 | Japan . |
| 645915 | 1/1989 | Japan . |
| 2116633 | 5/1990 | Japan . |

Primary Examiner—Stevan A. Resan
Attorney, Agent, or Firm—Oblon, Spivak, McClelland, Maier, & Neustadt

[57] ABSTRACT

A magnetic recording medium includes a coated type of magnetic layer containing magnetic powders substantially made up of hexagonal ferrite particles and a binder, and has the values of $$SQR_x \geqq 0.50$$

$$SQR_y \leqq 0.35$$

where $SQR_x$ is the squareness ratio of said magnetic layer in the recording track direction, and $SQR_y$ is the intra-surface squareness ratio of said magnetic layer in the direction perpendicular to the recording track direction, and has also the value of $$\alpha \geqq 3\%$$

where $\alpha$ is given by $$\alpha = I(006) \times 100/I(\%)$$

where I is the peak intensities, I(hkl), of the (hkl) planes of said magnetic layer upon X-ray diffraction, defined by $$I = I(006) + I(110) + I(107) + I(114)$$

6 Claims, 1 Drawing Sheet

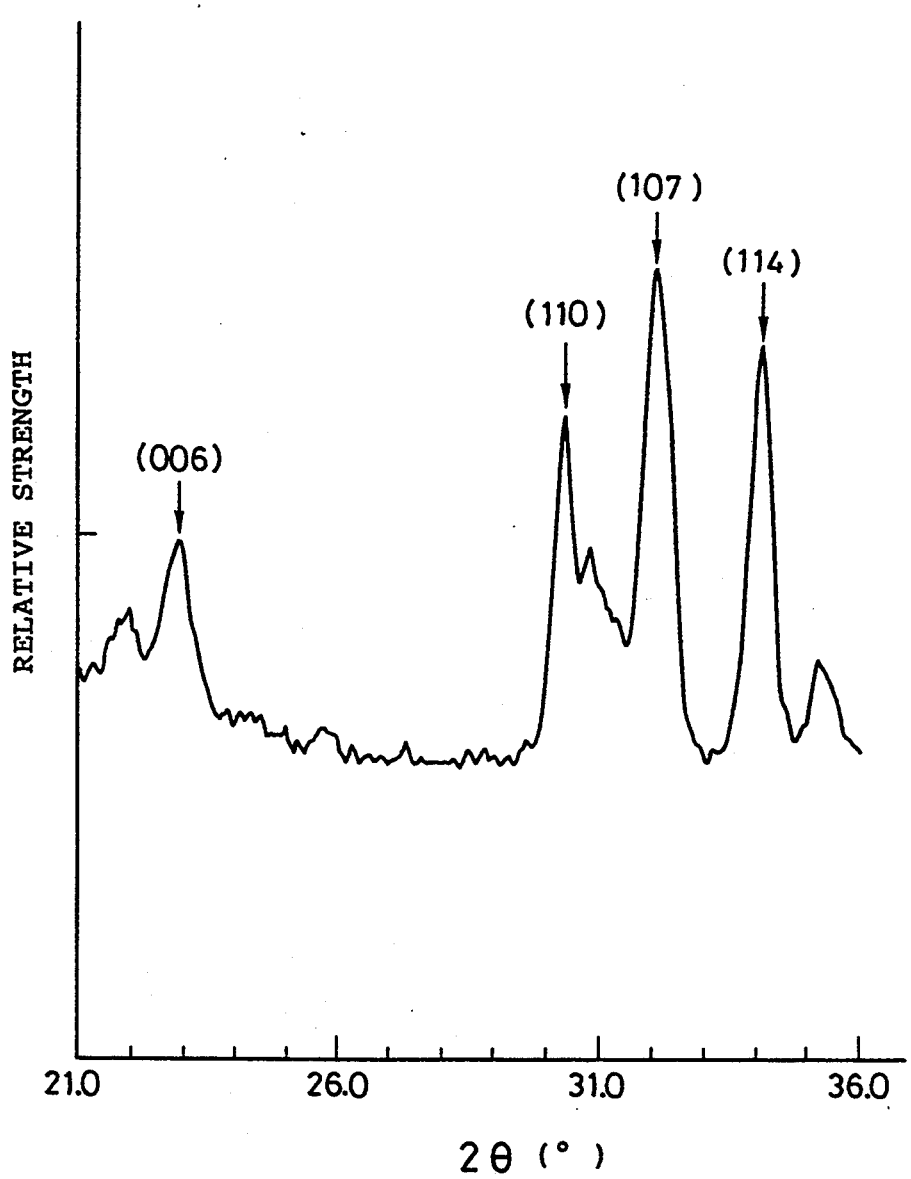

MAGNETIC RECORDING MEDIUM COMPRISING TWO MAGNETIC LAYERS OF HEXAGONAL FERRITE MAGNETIC PARTICLES AND BINDER WHEREIN THE EASY AXES OF THE PARTICLE IS SPECIFIED

BACKGROUND OF THE INVENTION

The present invention relates to a coated type of magnetic recording media for high-density recording such as video tapes or magnetic discs.

So far, magnetic recording media of the coated type using an acicular form of ferromagnetic powders such as $\gamma$-Fe$_2$O$_3$ have been used for audio tapes, video tapes and magnetic discs. These magnetic recording media of the coated type make longitudinal (or planar) recording with the magnetic layer that the easy axes of $\gamma$-Fe2O3 particles are oriented in the longitudinal direction. However, some limitation is placed on high-density recording achieved by longitudinal magnetization, because self-demagnetization increases with increases in recording density.

With such situations in mind, there has been proposed the so-called perpendicular recording mode in which magnetic recording is made by perpendicular magnetization, using a combination of a medium including a magnetic layer of perpendicularly oriented magnetic powders with a single-pole head. The perpendicular recording mode makes it possible to achieve some considerable improvement in recording density, because the internal demagnetizing field of the magnetic layer has the property of approaching zero with increases in recording density. For magnetic powders for the coated type of perpendicular recording medium, hexagonal ferrite powders in hexagonal plate geometry, such as barium ferrite powders, have been used, because they are readily oriented perpendicularly. A problem with the perpendicular recording medium is that the medium or a single-pole head usually used in conjunction with it wears away due to sliding. However, when a magnetic head for the longitudinal magnetic recording, for instance, an MIG type magnetic head is used together with the perpendicular recording medium, we have other problems, the asymmetry of readback pulse, getting the overwriting properties for lack of sufficiency of the magnetic head, and so on. This is particularly true of digital recording.

It is thus considered that even higher recording density will actually be achieved along an extension of the conventional longitudinal magnetic recording mode. For instance, a recording mode that takes the advantage of a component oriented perpendicularly with respect to the magnetic layer without recourse to the longitudinal magnetic recording mode—in which the easy axes are oriented within the surface of the magnetic layer in the recording track direction—is envisaged. An example of this mode has already been proposed in JP-A-3-280215 that discloses a coated type medium using ferromagnetic hexagonal ferrite powders, in which residual magnetization conforms to the relation of longitudinal->perpendicular>widthwise, and the (squareness) ratio of residual magnetization to saturation magnetization is at least 0.6 in the longitudinal direction, 0.3 to 0.7 inclusive in the perpendicular direction, and at most 0.3 in the widthwise direction. It is noted, however, that the magnetic recording medium set forth in this publication has for its object to keep the balance between long and short wavelength outputs in the video-related recording art.

Hexagonal ferrite powders are well fit for perpendicular recording, and are now under research as to their application to longitudinal recording media making use of their sharp magnetization inversion. These powders are used in the above-mentioned publication as well. Unlike ordinary acicular magnetic powders, hexagonal ferrite powders in hexagonal plate geometry are so increased in interactions between the magnetic particles that the actual degree of orientation of the particles found under a transmission electron microscope (TEM), etc., is worse than the orientation of the particles expected from the magnetization curve (B-H loop). To put it another way, the microscopic arrangement of the particles is not in agreement with the macroscopic magnetic properties of the particles. Parameters showing the orientation of magnetic powders in a magnetic layer include the above-mentioned squareness ratio and degree of orientation (that is given by Squareness Ratio in the orientation direction/Squareness Ratio in the direction perpendicular to the orientation direction). In the case of the hexagonal ferrite powders, however, even when the squareness ratios and degrees of orientation, both in the recording track direction and in the direction vertical to the magnetic layer, assume good-enough values, satisfactory read/write characteristics are not obtained in actual recording and reproduction, unless the particles are actually in alignment. In particular, there is some considerable degradation of S/N.

The present invention has been made in view of such situations, and has for its one object to provide an longitudinal magnetic recording medium having a perpendicularly oriented component, which is reduced in terms of the asymmetry of readback pulse, improved in terms of recording density and output, and excellent in S/N, and for its another object to provide a process enabling such a magnetic recording medium to be fabricated easily.

SUMMARY OF THE INVENTION

Such objects are accomplished by:

1. A magnetic recording medium including a coated type of magnetic layer containing magnetic powders substantially made up of hexagonal ferrite particles and a binder, which has the values of $SQR_x \geq 0.50$ $SQR_y \leq 0.35$ where $SQR_x$ is the squareness ratio of said magnetic layer in the recording track direction, and $SQR_y$ is the intra-surface squareness ratio of said magnetic layer in the direction perpendicular to the recording track direction, and has the value of $\alpha \geq 3\%$ where $\alpha$ is given by $\alpha = I(006) \times 100/I(\%)$ where I is the peak intensities, I(hkl), of the (hkl) planes of said magnetic layer upon X-ray diffraction, defined by $I = I(006) + I(110) + I(107) + I(114)$ 2. A magnetic recording medium according to claim 1, wherein the coercive force in the recording track direction is at least 1,000 Oe.

3. A magnetic recording medium according to claim 1, wherein said hexagonal ferrite particles are Ba ferrite particles.

4. A recording medium according to claim 1, wherein said magnetic layer is formed through the steps of applying a magnetic field to a first magnetic layer in the recording track direction for orientation, followed by drying; then forming a second magnetic layer on the first magnetic layer; and finally applying a magnetic field to the first and second magnetic layers in the perpendicular direction for orientation.

5. A magnetic recording medium according to claim 1, wherein said hexagonal substrate is rigid.

BRIEF DESCRIPTION OF THE DRAWING

The features of the invention which are believed to be novel are particularly pointed out and distinctly claimed in the concluding portion of this specification. However, the invention may be best understood by reference to the following detailed description taken in conjunction with FIG. 1 that is an X-ray diffraction data chart of the magnetic layer according to the invention.

DETAILED DESCRIPTION OF THE PREFERRED EMBODIMENTS

The present invention relates to a longitudinally magnetized coated type of magnetic recording medium including a perpendicularly oriented component.

The inventors have made intensive studies of a coated type of magnetic recording medium using hexagonal ferrite particles, and have consequently found that such read/write characteristics as recording density and S/N have closer relations to the arrangement of magnetic particles found from X-ray diffraction peak intensities than to such magnetic properties as squareness ratios and the degree of orientation that are affected by the interactions between particles.

In the invention, therefore, the arrangement of hexagonal ferrite particles in a magnetic layer is quantified from X-ray diffraction peak intensities and thereby controlled, with the exclusion of the interactions between those particles, and $SQR_x$ and $SQR_y$ are limited to the above-mentioned ranges, thereby achieving higher S/N and higher recording density and reducing the asymmetry of readback pulse.

It is here noted that JP-A-64-5915 and JP-A-2-116633 define the X-ray diffraction peak intensities of magnetic powders and refer to the relations of them to the properties of magnetic powders. It is also noted that both JP-A-61-184725 and JP-A-63-71924 describe a medium including a continuous thin film type of magnetic layer in terms of the relations of X-ray diffraction peak intensities to the orientation and perfection of crystal grains. However, nothing is disclosed about the coated type medium using hexagonal ferrite powders in which X-ray diffraction peak intensities are specified in combination with squareness ratios, as disclosed in the present disclosure.

With the production process disclosed in JP-A-3-280215 in which a magnetic field is applied to a single-layer magnetic film in the longitudinal or perpendicular direction, it is impossible to confine the value of the above-mentioned $\alpha$ within the range defined by the invention.

The present invention will now be explained at great length.

The magnetic recording medium of the invention includes a coated type of magnetic layer containing magnetic powders substantially made up of hexagonal ferrite particles and a binder, and has the values of $SQR_x \geq 0.50$, preferably $SQR_x \geq 0.60$ $SQR_y \leq 0.35$, preferably $SQR_y \leq 0.30$ where $SQR_x$ is the squareness ratio of said magnetic layer in the recording track direction, and $SQR_y$ is the longitudinal squareness ratio of said magnetic layer in the direction perpendicular to the recording track direction. When $SQR_x$ is below 0.50, difficulty is involved in obtaining high output, and the asymmetry of readback pulse becomes noticeable. When $SQR_y$ exceeds 0.35, it is difficult to increase output and recording density. It is noted that the lower limit of $SQR_y$ and the upper limit of $SQR_x$ are usually 0.1 and 0.95, respectively.

The magnetic recording medium of the invention has also the value of $\alpha \geq 3\%$, preferably $\alpha \geq 5\%$ where $\alpha$ is given by $\alpha = I(006) \times 100 / I(\%)$ where I is the peak intensities, I(hkl), of the (hkl) planes of said magnetic layer upon X-ray diffraction, defined by $I = I(006) + I(110) + I(107) + I(114)$ When $\alpha$ is below 3%, recording density and S/N become insufficient.

The normal vectors of the (006), (110), (107) and (114) lattice planes of the hexagonal ferrite particle are at the respective angles of 0°, 90°, 33.0° and 63.1° with respect to the easy axis (c axis) of the particle; that is, the peak intensities of these lattice planes correlate with the number of particles whose easy axes are at the above-mentioned angles with respect to the normal of the surface of the magnetic layer.

Ordinary $\theta$–$2\theta$ techniques may be used for X-ray diffraction, and the peak intensity is given by the area of each peak on an X-ray diffraction data chart.

Preferably, the magnetic layer has a coercive force of 1,000 Oe or more, as measured in the recording track direction. In view of the recording capacity of an associated magnetic head, it is also preferable that the magnetic layer has usually a coercive force of up to 4,000 Oe.

No particular limitation is imposed on the hexagonal ferrite particles used in the invention; suitable selection may be made from various ferrite particles such as Ba, Sr, Ca and Pb ferrite particles. These ferrites may also be used in combination of two or more, but preference is given to using Ba ferrite. Ba ferrite is a hexagonal oxide with the composition generally represented by $BaFe_{12}O_{19}$. In the invention, a part of Ba or Fe may have been substituted by at least one metal selected from the group of Ca, Sr, Pb, Co, Ni, Ti, Cr, Zn, In, Mn, Cu, Ge, Nb, Zr, Sn and other metals.

Hexagonal ferrite particle size may be suitably determined according to the purpose but, in view of read/- write characteristics, it is preferable to use particles having a mean particle diameter of up to 0.15 μm, esp., about 0.02 to 0.10 μm and a aspect ratio of at least 2, esp., about 3 to 10. Here, the "mean particle diameter" is given by the average value of diameter measurements of, for instance, about 50 or more particles observed under an electron microscope (scanning and transmission electron microscopes (SEM) and (TEM)), and the "aspect ratio" is given by Mean Particle Diameter/Mean Thickness It is understood that the hexagonal ferrite particle may be modified on the surface by spinel ferrite so as to increase the amount of magnetization and improve the temperature properties. Further, the particle may be provided on the surface with an oxide or organic compound layer so as to improve the durability and dispersibility.

The hexagonal ferrite particles may be fabricated by all available techniques such as ceramic, coprecipitation-firing, hydrothermal synthesis, flux, glass crystallization, alkoxide and plasma jet techniques. For the details of these procedures, see Yoshiyasu KOIKE and Osamu KUBO, "Ceramics 18 (1983)", No. 10, and so on.

The binder used for magnetic layer formation is not critical, and so may be suitably selected from various resins for ordinary binders.

The non-magnetic substrate on which the magnetic layer is to be formed may be suitably selected from various resin films, metals, ceramics, glasses, etc., depending on what it is used for, e.g., whether it is used in the form of magnetic discs or tapes.

Reference will now be made to how to apply the invention to a magnetic disc including a coated type of magnetic layer on a major surface of a rigid substrate.

A disc form of rigid substrate, for instance, may be formed of various non-magnetic materials such as metals like aluminum or its alloys, glasses, ceramics and engineering plastics. Among these, aluminum or its alloys are preferable, because of their high mechanical rigidity and good-enough processability. Substrate size may be determined depending on the purpose, and is usually about 0.5 to 1.9 mm in thickness, and about 40 to 130 mm in diameter. Preferably, the Rmax of the substrate is about 0.005 to 0.070 μm.

The magnetic layer is formed by applying a magnetic field.

The magnetic layer is formed by the coating of a magnetic paint containing magnetic powders and a binder. The magnetic paint is prepared by the dispersion of magnetic particles in the binder solution.

As the magnetic particles, the hexagonal ferrite particles are used. The binder used is not particularly limited; heat-curable resin, a reactive type of resin, radiation-curable resin, and other resin may be chosen depending on the purpose, but it is preferable to use heat- or radiation-curable resin because of the need of obtaining a good-enough film strength in a thin layer form and thereby achieving high durability. Suitable examples of the heat-curable resin are polycondensation types of resins such as phenolic resin, epoxy resin, vinyl copolymer resin, a polyurethane-cured type of resin, urea resin, butyral resin, formal resin, melamine resin, alkyd resin, silicone resin, an acrylic type of reactive resin, polyamide resin, epoxy-polyamide resin, saturated polyester resin and urea-formaldehyde resin; or mixtures of the above polycondensation types of resins with crosslinking agents like isocyanate compounds such as mixtures of high-molecular-weight polyester resins with isocyanate prepolymers, mixtures of acrylate copolymers with diisocyanate prepolymers, mixtures of polyester polyols with polyisocyanates, mixtures of low-molecular-weight glycols, high-molecular-weight diols and triphenylmethane isocyanates; mixtures of vinyl copolymer resins with crosslinking agents; mixtures of cellulosic resins such as nitrocellulose and cellulose acetate butyrate with crosslinking agents; synthetic rubber such as butadiene-acrylonitrile with crosslinking agents, and mixtures of these mixtures. Particular preference is given to a mixture of epoxy resin with phenolic resin, a mixture of epoxy resin, polyvinyl methyl ether and methylol phenol ether that is disclosed in U.S. Pat. No. 3,058,844, a mixture of a bisphenol A type epoxy resin and an acrylic or methacrylic ester polymer that is set forth in JP-A-49-131101.

Illustrative Examples of the radiation-curable compound are thermoplastic resins in the molecules of which there are introduced a group that is crosslinked or polymerized by exposure to radiations such as an acrylic double bond (e.g., acrylic acid or methacrylic acid having a radically polymerizable unsaturated double bond, or their ester compounds), an allyl double bond (e.g., diallyl phthalate), or an unsaturated bond (e.g., maleic acid or a maleic acid derivative). Besides, any other compound having an unsaturated double bond crosslinked and polymerized by exposure to radiations may be used. Preferable examples of the resin used as the radiation-curable binder are saturated or unsaturated polyester resin, polyurethane resin, vinyl chloride resin, polyvinyl alcohol resin, polyvinyl butyral resin, epoxy resin, phenoxy resin, cellulosic resin, an acrylonitrile-butadiene copolymer, polybutadiene, and so on, all containing the above unsaturated double bonds in their molecular chains, terminals or side chains. Preferable example of the radiation-curable compound used as an oligomer or monomer in the invention are mono- or poly-functional triazine, polyhydric alcohol, pentaerythritol, ester and urethane types of acrylates and methacrylates.

The amount of the binder in the magnetic paint is not subject to any special limitation, but is preferably in the range of about 10 to 50 parts by weight per 100 parts by weight of the magnetic powders.

The solvent used for the preparation of the magnetic paint is not subject to any special limitation, and so may be selected from various solvents, e.g., ketones such as cyclohexanone and isophorone, alcohols such as isopropyl alcohol and butyl alcohol, cellosolves such as ethyl cellosolve and Cellosolve acetate, and aromatic solvents such as toluene depending on the purpose. The amount of the solvent contained in the magnetic paint is not subject to any special limitation, but is preferably in the range of about 200 to 700 parts by weight per 100 parts by weight of the magnetic powders. If required, the magnetic paint may additionally contain a polishing agent such as $\alpha$-$Al_2O_3$, a lubricant such as silicone oil, and other various additives.

The magnetic paint is coated on the surface of the substrate that has been smoothened as by polishing. The surface of the substrate may have been treated with a coupling agent, curable resin, etc., or may otherwise include an anodized layer such as anodized aluminum, an oxide layer such as chromic acid, an electrolessly plated layer such as Ni—P—Cu, etc.

In order to obtain the above-mentioned X-ray diffraction peak intensities, $SQR_x$ and $SQR_y$, it is preferable that each magnetic layer is formed and oriented by the following process.

This process comprises a first magnetic layer-formation step, a longitudinal orientation step, a drying step, a second layer-formation step and a perpendicular orientation step in this order, wherein:

at said longitudinal orientation step, a magnetic field is applied to the first magnetic-layer in the recording track direction, at said second magnetic layer-formation step, the second magnetic layer is formed on the first magnetic layer, and at said perpendicular orientation step, a magnetic field is applied to the first and second magnetic layers in the perpendicular direction.

The magnetic paint used to form the second magnetic layer may be the same as that used to form the first magnetic layer, and may be different from that used to form the first magnetic layer in terms of magnetic particles, binder, and so on.

Each magnetic layer is preferably formed by spin coating. The step of forming the magnetic layer by spin coating basically involves the coating of the magnetic paint at a relatively low rpm and the spinning-out of the magnetic paint at a higher rpm. During the spin coating and spinning-out, the rpm of the substrate and the time for keeping the substrate at that rpm may be suitably determined and so is not subject to any special limitation, because they vary largely depending on the end thickness of the layer, the viscosity and composition of the coating material, the spin-coating atmosphere, and some other considerations. However, it is usual that the spin coating takes place at about 200 to 2,000 rpm for about 1 second to about 1 minute, and the spinning-out at about 1,000 to 7,000 rpm for about 5 seconds to about 1 minute.

Each magnetic layer may be formed in the air, but should preferably be formed in a solvent vapor-containing atmosphere. In this case, the solvent used is not subject to any special limitation with the proviso that it can be used for preparing the magnetic paint. It is noted that two or more solvents may be used to this end. Preferably, the atmospheric temperature is then preferably at about 20° to 50° C. Thus, if the magnetic layer is formed in the solvent vapor-containing atmosphere, it is then possible to prevent the magnetic layer from being dried up, thereby achieving sufficient orientation of the magnetic layer at the orientation step, and so forming the magnetic layer having high coercive force and a high squareness ratio S*.

Following the formation of each magnetic layer but prior to the orientation step, an additional leveling step may be provided so as to make the surface of the magnetic layer smooth. At the leveling step, it is preferable that the substrate is rotated at a low rpm, e.g., about 200 to 3,000 rpm for about 1 second to about 5 minutes. The leveling step, if provided, is again preferably done in the solvent vapor-containing atmosphere.

No special limitation is imposed on how to apply the magnetic field to the layer at each orientation step. In order to apply the magnetic field to the layer in the recording track direction at the longitudinal orientation step, for instance, there is preferably provided at least a pair of magnets with the same poles opposite to each other, between which the substrate is then rotated. In order to apply the magnetic field to the layer in the perpendicular direction at the perpendicular orientation step, there is preferably provided at least a pair of magnets with the different poles opposite to each other, between which the disc is then rotated.

Preferably, the magnetic field created by the orientation magnets are about 1,000 to 10,000 G in the film, and the disc is rotated at about 100 to 500 rpm for an orientation time of about 10 seconds to about 10 minutes. The orientation atmosphere may or may not contain the solvent vapor mentioned above.

In the magnetic layer of the double-layer structure obtained by this process, it is not that there are distinct boundaries between the first magnetic layer oriented in the longitudinal direction and the second magnetic layer oriented in the perpendicular direction. In other words, it appears that the easy axes are almost nearly perpendicular to the layer in a zone close to the second magnetic layer, the easy axes are almost nearly parallel with the magnetic layer in a zone close to the surface of the disc, and the directions of the easy axes change continuously between both the zones.

At the drying step the first magnetic layer is dried. Following the drying of the oriented first magnetic layer, the second magnetic layer is formed on the first layer and then dried, thereby obtaining the values of $\alpha$, $SQR_x$ and $SQR_y$ mentioned above. Each layer may be dried either spontaneously or forcibly by heating. However, the drying-by-heating is preferably done at a temperature lower than about 100° C. It is noted that following the perpendicular orientation step, the second magnetic layer is usually dried.

After these steps have been finished, the magnetic layers are cured. When the binder is a heat-curable resin, the magnetic layers are usually cured at about 150° to 300° C. for about 1 to 5 hours, although various conditions for the heat-curing treatment, e.g., heat-curing temperature and time, may be suitably determined depending on the type of binder. In the case of a radiation-curable resin, on the other hand, the magnetic films may be treated at normal temperature and a dose of about 3 to 10 Mrad. The curing treatment is preferably done in an inert gas atmosphere, esp., in a nitrogen atmosphere. The magnetic layer after the curing has preferably a thickness of up to 0.6 $\mu$m, esp., up to 0.3 $\mu$m.

Following the curing, the magnetic layer is preferably polished on the surface. The polishing may be done by various polishing materials such as polishing tape, whereby the magnetic layer is not only allowed to have a desired surface roughness, but can be regulated in thickness as well.

Following the polishing, the magnetic layer is preferably coated and thereby impregnated on the surface with a liquid lubricant. Although the liquid lubricant used is not subject to any special limitation, it is preferable to use a liquid lubricant containing a fluorine-containing organic compound, because it has good-enough lubricating properties. No special limitation is placed on how to coat the liquid lubricant, and so use may be made of dipping or spin coating, for instance. It is noted that such a liquid lubricant may have been contained in the magnetic paint.

After the impregnation of the liquid lubricant, the magnetic layer is preferably vanished so as to better the surface smoothness of the magnetic disc.

While the present invention has been described with reference to the production of magnetic discs, magnetic tapes having the values of $\alpha$, $SQR_x$ and $SQR_y$ men-

EXAMPLES

In the following description, the present invention will be explained with reference to some examples of the invention that are intended to illustrate and not to limit the invention.

The magnetic disc samples-shown in Table 1 were prepared as follows.

| Sample No. 1 Composition for Magnetic Paint | |
|---|---|
| Magnetic Particles<br>Composition: Ba ferrite (940 Oe)<br>Mean Particle Diameter: 0.05 μm<br>Plate Ratio: 3 | 100 parts by weight |
| α-Al$_2$O$_3$ | 3 parts by weight |
| Epoxy Resin<br>(EPIKOTE 1004 made by Shell<br>Chemical Co.) | 14 parts by weight |
| Phenol Resin<br>(SUMILAK PC25 made by Sumitomo<br>Bakelite Co., Ltd.) | 6 parts by weight |
| Solvents<br>Cyclohexanone/Isophorone<br>(1:1 mixture) | 280 parts by weight |

The composition for magnetic paint mentioned above was mixed and dispersed in a ball mill for 140 hours to prepare a magnetic paint having a viscosity of 400 cps.

Then, the following steps were carried out.

Step of Forming the First Magnetic Layer

The first magnetic layer-was formed on both major surfaces of a substrate with the use of a spin coater. The substrate was an aluminum plate of 95 mm in outer diameter, 25 mm in inner diameter and 1.28 mm in thickness. While the substrate was rotated at 1,000 rpm, the magnetic paint was coated thereon for 10 seconds. Then, the revolutions per minute of the substrate were brought up to 4,000 rpm at which the substrate was retained for 5 seconds for spinning out the magnetic paint. It is noted that layer formation took place in an atmosphere containing cyclohexanone vapor.

Longitudinal Orientation Step

Then, while the substrate was rotated between a pair of magnets with the same poles opposite to each other, a magnetic field was applied thereto in the circumferential direction. The revolutions per minute of the substrate were 200 rpm, the orientation field strength in the magnetic layer was 3.0 kG, and the magnetic field was applied to the substrate for 60 seconds.

Drying Step

After the application of the magnetic field, the first magnetic layer was dried.

Step of Forming the Second Magnetic Layer

As in the case of the first magnetic layer, the second magnetic layer was prepared, using the magnetic paint mentioned above.

Perpendicular Orientation Step

Then, while the substrate was rotated between a pair of magnets with the different poles opposite to each other, a magnetic field was applied to the magnetic layer in the perpendicular direction. The revolutions per minute of the substrates was 200 rpm, the orientation field strength in the magnetic layer was 3.0 kG, and the magnetic field was applied to the magnetic layer for 60 seconds.

Drying Step

After the application of the magnetic field, the second magnetic layer was dried.

After this drying, the magnetic layers were cured by a 3-hour heat treatment at 200° C. in a nitrogen stream to form a magnetic layer. Following this, polishing tape WA10000 (made by Nippon Microcoating Co., Ltd.) was used to polish the magnetic layer in an amount of about 0.05 μm, thereby regulating the thickness of the magnetic layer and smoothening the surface thereof. The thickness of the magnetic layer is referred to in Table 1.

Then, the substrate and magnetic layer were washed on the surfaces, coated and thereby impregnated with a 0.1% solution of fluorocarbon (KRITOX 143CZ made by Du Pont) in flon by dipping, thereby obtaining a magnetic disc.

Sample No. 2 of the Invention

This sample was prepared as in the case of Sample No. 1, provided that a field strength of 1.0 kG was applied at the perpendicular orientation step.

Sample No. 3 for Comparison

This sample was prepared following the procedures of making Sample No. 1, with the exception that any step was not provided after the step of forming the second magnetic layer.

Sample No. 4 for Comparison

This sample was prepared following the procedures of making Sample No. 1, with the exception that the longitudinal orientation step (under the same conditions as those for Sample No. 1) was done in place of the perpendicular orientation step after the step of forming the second magnetic layer.

Sample No. 5 for Comparison

This sample was prepared as in the case of Sample No. 1, with the proviso that the longitudinal and perpendicular orientation steps were not provided.

Sample No. 6 for Comparison

This sample was prepared as in the case of Sample No. 1, with the proviso that neither the longitudinal orientation step nor the steps subsequent to the step of forming the second magnetic layer were provided.

Sample No. 7 for Comparison

This sample was prepared following the procedures of making Sample No. 1, with the exception that the perpendicular orientation step (under the same conditions as those for Sample No. 1) and the longitudinal orientation step (under the same conditions for those for Sample No. 1) were successively done after the step of forming the first magnetic layer, and any step was not provided after the step of forming the second magnetic layer.

Sample No. 8 for Comparison

This sample was prepared following the procedures of making Sample No. 1, with the exception that the perpendicular orientation step (under the same conditions as those for Sample No. 2) and the longitudinal orientation step (under the same conditions for those for Sample No. 1) were successively done after the step of forming the first magnetic layer, and any step was not provided after the step of forming the second magnetic layer.

Each sample was measured in terms of the magnetic properties set out in Table 1, in which $SQR_x$ and $Hc_x$ are the squareness ratio and coercive force, as measured in the circumferential direction, $SQR_y$ and $Hc_y$ are the squareness ratio and coercive force, as determined in the diametrical direction, and $Hc_z$ is the coercive force, as found in the perpendicular direction with respect to the magnetic layer, all determined with the use of a vibrating sample magnetometer (VSM).

This is the peak-to-peak (P-P) value when the disc was rotated at 3,600 rpm and a recording frequency of 3.3 MHz, in kFRPI (kilo Flux Reverse Per Inch).

(3) $D_{50}$

This is the recording density when the P-P value for reproduction output was reduced to 50% of the P-P value of solitary wave reproduction output. The recording density was changed by changing the frequencies of recording signals.

TABLE 1

| Sample No. | I (006) | I (110) | I (107) | I (114) | I | α (%) | $SQR_x$ | $SQR_y$ | $Hc_x$ (Oe) | $Hc_y$ (Oe) | $Hc_z$ (Oe) | Thickness (μm) | S/N (dB) | $D_{50}$ (kFRPI) | Output ($mV_{p-p}$) |
|---|---|---|---|---|---|---|---|---|---|---|---|---|---|---|---|
| 1 | 7595 | 12095 | 21227 | 18350 | 59267 | 12.81 | 0.598 | 0.346 | 1332 | 1088 | 1278 | 0.434 | 27.6 | 39.8 | 0.34 |
| 2 | 1666 | 10529 | 16409 | 19671 | 48275 | 3.45 | 0.606 | 0.341 | 1351 | 1067 | 1260 | 0.431 | 27.2 | 38.5 | 0.33 |
| 3 (Comparison) | 7 | 13554 | 2221 | 14580 | 30362 | 0.02* | 0.786 | 0.380* | 1338 | 1124 | 1230 | 0.279 | 23.0 | 38.6 | 0.19 |
| 4 (Comparison) | 646 | 19379 | 5488 | 21335 | 46848 | 1.38* | 0.735 | 0.367* | 1402 | 1162 | 1254 | 0.453 | 26.5 | 34.6 | 0.32 |
| 5 (Comparison) | 875 | 10034 | 13112 | 20777 | 44798 | 1.95* | 0.613 | 0.490* | 1365 | 1293 | 1342 | 0.350 | 24.5 | 34.8 | 0.21 |
| 6 (Comparison) | 746 | 8522 | 11145 | 17657 | 38070 | 1.96* | 0.616 | 0.518* | 1328 | 1298 | 1285 | 0.255 | 23.5 | 38.0 | 0.18 |
| 7 (Comparison) | 2760 | 5846 | 27721 | 6560 | 42887 | 6.53 | 0.485* | 0.367* | 1277 | 1193 | 1385 | 0.281 | 24.3 | 39.1 | 0.19 |
| 8 (Comparison) | 1069 | 9564 | 12115 | 18860 | 41608 | 2.57* | 0.716 | 0.355* | 1316 | 1162 | 1383 | 0.274 | 26.8 | 38.1 | 0.22 |

*)Departures from the invention

The magnetic layer of each sample was X-ray diffracted to measure the peak intensity of each plane, from which the value of α mentioned above was found. The results are set out in Table 1. The X-ray diffraction data chart of Sample No. 1 is presented in the form of FIG. 1. To this end, ordinary θ–2θ techniques were used, with an X-ray bulb of Cu, a voltage of 50 kV and a current of 40 mA.

Each sample was further measured in terms of the following properties. The results are also referred to in Table 1.

(1) S/N

The S/N of each sample was measured on the innermost circumference. For recording and reproducing, use was made of a magnetic disc drive having a monolithic MIG flying type head of 0.6 μm in gap length. The sample was rotated at 3,600 rpm, with the flying height fixed at 0.25 μm. Data was written on the disc at a recording frequency of 3.3 MHz, and reproduction output (Vrms) was then measured with an alternating current voltometer working at a 10-MHz band. Then, direct current erasion was done three time on this track, followed by the measurement of reproduction output ($V_{DCrms}$) with an alternating current voltometer. Further, while the head was loaded on, system noise ($V_{noise}$) was determined. The S/N was then found from:

$$S/N = V_{rms}/(V_{DCrms}^2 - V_{noise}^2)^{\frac{1}{2}}$$

(2) Reproduction Output

It is believed that the effect of the invention is appreciated from the results set out in Table 1.

What we claim is:

1. A magnetic recording medium comprising a substrate, a first magnetic layer coated thereon having at least one recording track, and a second magnetic layer coated on the first magnetic layer, said magnetic layers being composed essentially of magnetic hexagonal ferrite particles and binder, and wherein the easy axes of the magnetic particles in the first magnetic layer in a zone adjacent to the surface of the substrate are oriented substantially in the recording track direction, and the easy axes of the magnetic particles in the second magnetic layer in a zone adjacent to the surface of the medium are oriented substantially perpendicular to the second layer's surface, and the easy axis of the magnetic particles changes in a continuous manner from substantially in the recording track direction to substantially in the perpendicular direction between said zones, said magnetic recording medium having the values of $SQR_x \geq 0.50$ $SQR_y \leq 0.35$ where $SQR_x$ is the squareness ratio of said magnetic layer in the recording track direction, $SQR_y$ is the intra-surface squareness ratio of said magnetic layer in the direction perpendicular to the recording track direction, and has the value of $\geq 3\%$ wherein $\alpha$ is given by $$\alpha = I(006) \times 100 / I (\%)$$

wherein I is the peak intensities, I(hkl), of the (hkl) planes of said magnetic layer upon x-ray diffraction, defined by $$I = I(006) + I(110) + I(107) + I(114).$$

2. A magnetic recording medium according to claim 1, wherein the coercive force in the recording track direction is at least 1,000 Oe.

3. A magnetic recording medium according to claim 1, wherein said hexagonal ferrite particles are Ba ferrite particles.

4. A magnetic recording medium according to claim 1, wherein said substrate is rigid.

5. A magnetic recording medium as set forth in claim 1, said medium being disc shaped and having a circumferential recording track.

6. A magnetic recording medium according to claim 1, wherein said magnetic material is formed by forming a first layer of magnetic coating, applying a magnetic field to said first magnetic layer in the recording track direction for orientation, followed by drying; then forming a second magnetic layer on the first magnetic layer; and applying a magnetic field to the first and second magnetic layers in the perpendicular direction for orientation.

* * * * *

UNITED STATES PATENT AND TRADEMARK OFFICE
CERTIFICATE OF CORRECTION

PATENT NO. : 5,419,938
DATED : May 30, 1995
INVENTOR(S) : Kagotani et al

It is certified that error appears in the above-indentified patent and that said Letters Patent is hereby corrected as shown below:

Claim 1, Column 13, line 1, before "≥3%" insert --α--;

line 6, before "=I(006)X100/I(%)" insert --α--.

Signed and Sealed this

Second Day of April, 1996

Attest:

BRUCE LEHMAN

Attesting Officer  Commissioner of Patents and Trademarks